No. 781,303. PATENTED JAN. 31, 1905.
I. S. RICHARDSON.
LUMBER WAGON.
APPLICATION FILED MAY 12, 1904.
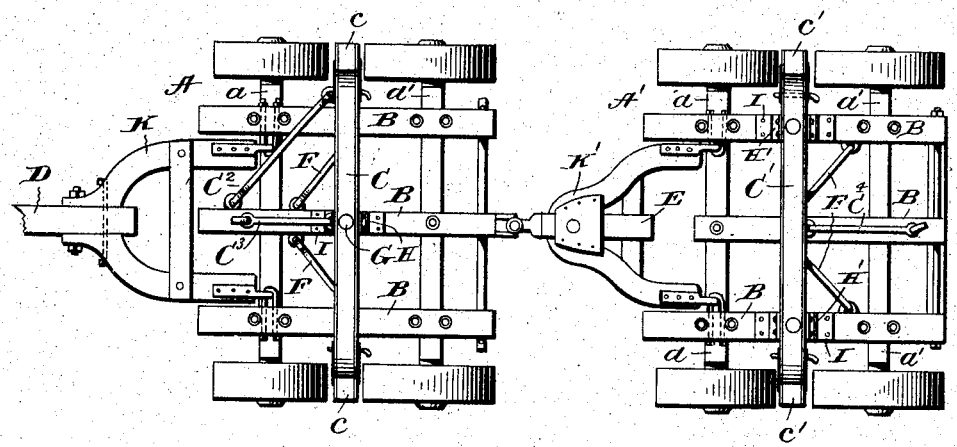
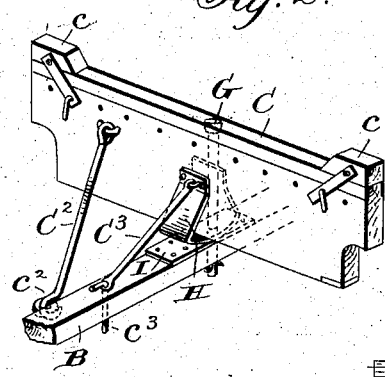
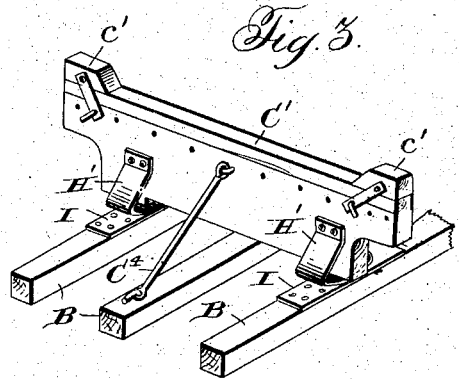
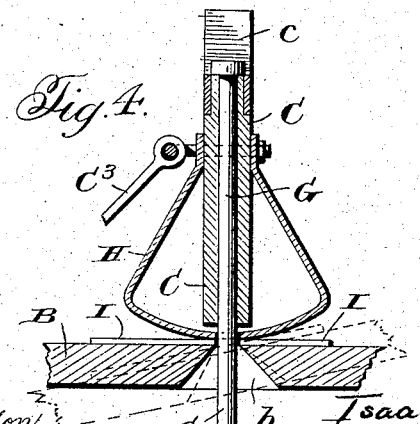
Witnesses:
Jas. E. Hutchinson
Thos. P. Heath
Inventor:
Isaac S. Richardson,
by Jas. P. Hunter, Attorney No. 781,303.

Patented January 31, 1905.

UNITED STATES PATENT OFFICE.

ISAAC S. RICHARDSON, OF SPRINGFIELD, LOUISIANA.

LUMBER-WAGON.

SPECIFICATION forming part of Letters Patent No. 781,303, dated January 31, 1905.

Application filed May 12, 1904. Serial No. 207,630.

*To all whom it may concern:*

Be it known that I, ISAAC S. RICHARDSON, a citizen of the United States, residing at Springfield, in the parish of Livingston and State of Louisiana, have invented certain new and useful Improvements in Lumber-Wagons, of which the following is a specification, reference being had therein to the accompanying drawings.

This invention relates to an improvement in lumber-wagons, and primarily to lumber-wagons in which two four-wheel trucks coupled together are employed each of which is provided with a bolster adapted to support the load; and its object is the provision of a wagon of this type in which the trucks are free to rock longitudinally and independently of their bolsters when the wagon is drawn over rough or uneven ground, the bolsters being held in a substantially vertical position by the weight of the load.

In the drawings, wherein a preferable embodiment of my invention is shown and wherein like numerals of reference refer to similar parts in the several views, Figure 1 is a top plan view of my improved eight-wheel lumber-wagon. Fig. 2 is a detail view showing the construction of the front bolster. Fig. 3 is a detail view showing the construction of the rear bolster, and Fig. 4 is a detail sectional view.

Referring now more particularly to the drawings, A and A' designate two four-wheel trucks, which are designed to be coupled together to form the wagon. Each of the trucks is provided with front and rear axles $a$ $a$ and $a'$ $a'$ and with three longitudinally-disposed bars B B B, rigidly connecting the axles. Pivotally connected to the forward ends of the two outer bars B B on each of the trucks A and A' are the hounds K and K'. The forward ends of the hounds K are rigidly connected to a tongue D in any suitable manner, while the forward ends of the hounds K' are rigidly connected in any suitable manner with a short bar E, which has its forward end pivotally connected to the rear end of the intermediate bar B of the front truck. The pivotal connection of the hounds K and K' with the side bars B B of the trucks is preferably made directly over the front axle, which prevents pulling the wheels into the ground when rising over a hill, as is the case when the hounds are pivoted in advance of the axle. The intermediate bars B on each of the trucks A and A' are connected to the side bars B B by means of brace-rods F of any suitable construction.

C designates the front bolster, secured to the truck A, and C' the rear bolster, secured on the truck A'. The bolsters C and C' are each provided at their extremities with the usual blocks $c$ $c$ and $c'$ $c'$ for supporting the load. The bolster C is secured to the front truck A by means of the king-bolt G, which passes through a slot $b$ in the intermediate bar B. The slot $b$ extends completely through the bar B and is tapered outwardly from top to bottom for a purpose to be hereinafter set forth.

H is a longitudinally-disposed rocker secured in any suitable manner to the under side of the bolster C directly over the upper surface of the intermediate bar B. The rocker H is apertured to permit of the passage therethrough of the king-bolt G. That portion of the upper surface of the intermediate bar B adjacent the rocker H is provided with a wear-plate I.

In order to hold the bolster C from rocking while the wagon is being loaded, I provide the braces $C^2$ and $C^3$, which have their inner ends pivotally secured in any suitable manner the one to the outer portion of the bolster and the other to the upper central portion of the bolster and their outer ends detachably secured to the central bar B of the truck. The outer ends of the brace-rods $C^2$ and $C^3$ are preferably secured to the central bar B of the truck by means of pins $c^2$ and $c^3$, which pass through eyes in the ends of the brace-rods and holes in the bar B. It will be seen that when the forward ends of the brace-rods $C^2$ and $C^3$ are secured to the intermediate bar B of the truck A the bolster C will be prevented from rocking on the rocker H or turning on the king-bolt G. After the wagon has been loaded the pins $c^2$ and $c^3$ are removed and the braces $C^2$ and $C^3$ are swung up and secured in any suitable manner to the bolster. The bolster C' on the rear truck A' is provided with two rockers H' and H', which are supported on the upper surface of the two outer bars B B instead of with a single rocker; but as the structure of the rockers H' and H' is exactly the same as the structure of the rocker H on the front bolster I have not deemed it necessary to give a detailed description of them here. Inasmuch as the rear bolster C" is provided with two rockers, it is obvious that a single brace will be all that is necessary to hold the same from rocking while the wagon is being loaded—namely, the brace $C^4$, which is similar in structure to the brace $C^3$, before described.

From the above-described construction it will be seen that when the wagon is drawn over rough or uneven ground the trucks A and A' will rock longitudinally and relatively to their bolsters C and C', the bolsters being held in substantially vertical position by the weight of the load and said rocking movement being permitted by reason of the rockers secured to the under side of the bolsters and the tapered slots in the bars of the trucks in which the king-bolts of the bolsters work. This construction serves to equalize the weight of the load when traveling over rough ground.

I do not desire to limit myself to the precise form and construction shown in the drawings, as it is obvious that many changes might be made in the form shown therein without departing from the spirit of the invention.

Having thus described the invention, what is claimed as new, and desired to be secured by Letters Patent, is—

1. A wagon provided with bolsters, rockers interposed between said bolsters and the wagon running-gear, and means for holding said bolsters against rocking movement.

2. In a wagon, a bolster, a longitudinally-disposed rocker interposed between said bolster and the wagon running-gear, and a brace connecting said bolster and a stationary portion of the wagon for holding said bolster against rocking movement.

3. In a wagon, a bolster mounted to rotate and to rock longitudinally, and means for holding said bolster against either rotating or rocking movement.

4. In a wagon, a reach, a bolster pivoted thereon, a longitudinally-disposed rocker interposed between said bolster and said reach, a brace connecting the outer end of said bolster with said reach to prevent pivotal movement of the bolster thereon, and a second brace connecting the upper central portion of the bolster with the reach to prevent rocking movement of said bolster.

In testimony whereof I affix my signature in presence of two witnesses.

ISAAC S. RICHARDSON.

Witnesses:
 H. C. COZENS,
 H. E. RANNEY.